United States Patent [19]
Reid

[11] 4,087,288
[45] May 2, 1978

[54] SOLAR ABSORBER SURFACES

[75] Inventor: Alan Forrest Reid, Hawthorn, Australia

[73] Assignee: Commonwealth Scientific and Industrial Research Organization, Campbell, Australia

[21] Appl. No.: 705,195

[22] Filed: Jul. 14, 1976

[51] Int. Cl.² .......................... F24J 3/02; B05D 3/10; B05D 1/18
[52] U.S. Cl. .................................. 148/6.2; 126/270; 148/6.14 R; 148/6.31; 148/31.5; 427/160
[58] Field of Search .............................. 427/160, 162; 148/6.14 R, 6.31, 31.5, 6.2; 428/469, 472; 126/270

[56] References Cited

U.S. PATENT DOCUMENTS

| 2,460,896 | 2/1949 | Meyer | 148/6.14 R |
| 2,481,854 | 9/1949 | MacMahon | 148/6.14 R |
| 3,198,672 | 8/1965 | De Hart | 148/6.14 R |

Primary Examiner—James R. Hoffman
Attorney, Agent, or Firm—Sughrue, Rothwell, Mion, Zinn and Macpeak

[57] ABSTRACT

A method for improving the selectivity of a black copper oxide absorber surface which comprises treating the surface with a solution containing chromate ions and ammonium ions. Copper black surfaces when so treated and solar absorbers with such surfaces are included.

12 Claims, No Drawings

SOLAR ABSORBER SURFACES

This invention relates to a method for improving the selectivity of solar absorber surfaces and to improved absorber surfaces and solar absorbers incorporating such surfaces.

Solar absorbers function by absorbing the major energy component of the sun's radiation in the visible and near infrared ranges. They should have very low emission in the infrared and thus not re-radiate once they have been heated up. The aim of a useful selective absorber surface is to maximise the solar absorption $\alpha_s$ in the wavelength range 0.35 to 2 microns and to minimise the infrared re-emission characteristic of the temperature, to which the surface is heated.

This emissivity, $\epsilon_T$, corresponds by the laws of radiation and absorption, to the difference between ideal 100% reflectivity and the infrared reflectivity actually observed. Absolute emissivities change with temperature, but relative values for two different surfaces, $(\epsilon_1/\epsilon_2)_T$ change more slowly, and for the purposes of comparison, measurements made near ambient temperature are sufficient, and are normally used.

In one form of commercial solar heaters as presently constructed a coating of copper-black is placed on copper metal by treatment with a solution of sodium hydroxide and sodium chlorite. X-ray investigation has shown this coating to be mainly cuprous oxide. This material has the intrinsic properties necessary for selective absorption.

A good commercial surface has typically an 88% integrated absorption, $\alpha_s$, and 15% to 7% emission, $\epsilon_T$, over the wave-length ranges of interest. Surfaces which have higher absorption and lower emission would obviously be more efficient but this up until the present has been a difficult result to achieve.

The present invention in one aspect now provides a method whereby both the absorption and emission properties of certain selective black oxide surfaces can be significantly improved. In particular, in the case of copper black absorber surfaces, the method of this invention produces results which were not to be expected on the basis of the known properties of copper-black absorbers.

According to one aspect of the present invention there is provided a method for improving the selectivity of a black copper oxide absorber surface which comprises treating the surface with a solution containing chromate ions and ammonium ions.

A neutral or near neutral solution of ammonium chromate is especially preferred. However, any solution which contains chromate and ammonium ions can be used, e.g., a solution of sodium chromate and an ammonium salt, and the solution can be alkaline, neutral or even slightly acid. Strongly acidic solutions cannot be used however as these will dissolve the oxide surface.

An approximately 10% w/w solution of ammonium chromate (or the equivalent concentrations of a chromate salt and an ammonium salt) is preferred.

The temperature of the solution is not especially critical and may be between room temperature and the boiling point of the solution. A temperature range of about 40° to 80° is preferred. The reaction is relatively rapid at first and contact time of from 5 to 20 minutes at 45° to about 80° is preferred, but shorter times at higher temperatures or longer times at lower temperatures may be used.

After treatment, the surface may be washed with water to remove any soluble residual chromate.

Surfaces produced by this method have both a higher absorbance of solar radiation and a lower emittance of collected heat than untreated surfaces. They have a greatly increased resistance to erosion by condensation of water on the surfaces, and an increased resistance to thermal degradation. The absolute absorption is very high for surface which can be produced by such a simple method and one which is so readily applicable to large scale production. In addition, and unexpectedly, the infrared cutoff edge was found to be moved to shorter wave-lengths, thus conferring an added advantage in lower radiant heat losses at operating temperatures above 25° C.

For a typical copper-black surface, the absorbance of solar radiation integrated over the wave-length range 0.35 to 2 microns was increased by chromate treatment in accordance with the invention from 88% to 93% and the emission, $\epsilon_T$, integrated over the ambient black body emission range was reduced from 8% to 6%. Similar results were obtained after ageing tests at 25° C for one year.

It is a striking property of the selective surfaces produced by the method of this invention, that absorbance $\alpha_s$ is increased and emittance $\epsilon_T$ is decreased. For known non-selective coatings, such as black paints, both properties are increased or decreased together.

These selective properties may in part be related to the spectral absorption properties of $Cr^{3+}$ or $Cr^{6+}$ ions and their compounds, but may also be due to increased smoothness of the films, leading to a more specular surface and less surface scattering, and to advantageous alteration of surface refractive indices.

Electron microprobe analysis of the surface film formed on copper-black coatings by the chromate treatment of the invention showed chromium to constitute up to a few weight percent of the total surface oxide film, and scanning electron microscope images showed the treated surface to be smoother and more fine-grained than the untreated oxide film.

The process of treating copper black surfaces in accordance with the invention is unexpectedly specific and requires the presence of both the chromate ion ($CrO_4^=$) and the ammonium ion ($NH_4^+$). In the substantial absence of either of these ions, the process will not work. Thus, treatment at 80° C for 10 minutes with each of the following solutions gave no useful change in surface properties:

(A) Sodium chromate, 10 wt% (i.e. no $NH_4^+$)

(B) Ammonium dichromate, 10 wt% (i.e. no $CrO_4^=$)

(C) Aqueous ammonia plus sodium chromate (together equivalent to 10 wt% of ammonium chromate), (i.e. no $NH_4^+$).

It is not possible to perform copper-black preparation and chromate treatment in one bath, as the sodium chlorite ($NaClO_2$) necessary for copper-black production is oxidized by the chromate solution. Copper sheet dipped in the combined solution remained bright and unreacted.

In acid solutions, such as chromic acid, or acidified ammonium chromate, the copper-black surface film tends to dissolve, and can easily be totally removed. Thus neutral or near neutral solutions containing ammonium and chromate ions appear to provide the most satisfactory practical method of treating copper-black surfaces.

In the method of the invention, the extent of the reaction increases only slightly with increased time or increased temperature of the chromate treatment. For a set of samples cut from the same sheet of copper coated with copper-black and having an $\alpha_s$ of 0.871 and a $\epsilon_T$ value of 7.8%, the $\alpha_T$ values obtained after treatment for 10 minutes in a 10 wt% ammonium chromate solution at temperatures of 20°, 40°, 60°, and 80° C, were 6.8, 6.4, 6.4 and 5.9% respectively. However, the final absorbance was in each case essentially the same, 0.926 ± .003, Table 1.

The method of the invention is also of advantage in allowing the use of any suitable material for the construction of the solar absorber, and following the placement of a surface coating of copper or a copper alloy by means such as electroplating, electroless deposition, chemical or thermal treatment, and the formation of a copper black film on this surface, the method of the invention may then be applied.

It will thus be seen that, without implying in any way any limitation of the scope of the present invention, in its various aspects, it can be briefly stated that the invention embodies the following main concepts:

1. Improvement in the selectivity of solar absorber surfaces by treatment with chromate solutions containing ammonium ions.
2. Use of ammonium chromate solutions or equivalent, to treat copper-black surfaces to improve their selective solar absorbance properties.
3. Improvement in the thermal and natural degradation resistance, and in resistance to water, vapour or condensation erosion.
4. Techniques 1 or 2 applied to copper black surface on copper or copper alloy films deposited, placed or formed over any other materials of construction.

Those skilled in the art will appreciate that the invention described herein is susceptible to variations and modifications other than those specifically described. It is to be understood that the invention includes all such variations and modifications which fall within its spirit and scope.

EXAMPLES

EXAMPLE 1

A piece of copper sheet, 1 mm thick, uniformly blackened by treatment in a bath containing alkaline sodium chlorite, according to published methods, was cut into a number of 50 mm × 50 mm sections. These were treated for a variety of times and at various temperatures in baths containing 10% by weight of ammonium chromate in water.

The following absorbances and emittances were observed before and after treatment.

| Time Minutes | T, ° C | Integrated Solar Absorbance, $\alpha_s$ | Integrated Emittance $\epsilon_T$ |
| --- | --- | --- | --- |
| Before treatment | | 0.871 | 0.074 |
| After treatment | | | |
| 10 | 20 | .923 | .068 |
| 10 | 40 | .929 | .064 |
| 5 | 40 | .927 | .064 |
| 10 | 60 | .924 | .064 |
| 10 | 80 | .918 | .059 |
| 20 | 80 | .926 | .060 |

EXAMPLE 2

A commercial solar absorber panel 1000 mm × 600 mm, blackened according to procedure similar to those in Example 1 was immersed for five minutes in a 10 weight percent ammonium chromate solution at 45°. A random sample from this surface showed $\alpha_s = 0.873$, $\epsilon_T = 0.078$ before treatment, and $\alpha_s = 0.912$, $\epsilon_T = .066$ after treatment.

EXAMPLE 3

A number of 50 mm × 50 mm pieces of blackened copper sheet, as in Example 1, were treated in solutions of ammonium sulphate plus sodium chromate, and in solutions of ammonium chloride plus sodium chromate, in each case equivalent in concentration to 10 weight percent ammonium chromate. The $\alpha_s$ and $\epsilon_T$ before treatment were as in Example 1. After treatment for 10 minutes at 60° C the specimens $\alpha_s$ and $\epsilon_T$ values lying within the ranges $\alpha_s = 0.926 \pm .003$ and $\epsilon_T = 0.064 \pm .002$.

EXAMPLE 4

Untreated and ammonium chromate-treated pieces of blackened copper 50 mm × 50 mm were left at 30° C in an atmosphere saturated in water vapour for three months, and equivalent untreated and treated pieces were stored at normal humidity (25° C, 50% relative humidity) in a closed vessel.

After the three month period the untreated surface exposed to saturation water vapour pressures was in some places bare of all of its copper blackening, while the treated surfaces were indistinguishable by appearance and measurement of $\alpha_s$ and $\epsilon_T$ from their initial condition.

EXAMPLE 5

Pieces of copper with treated and untreated copper black surfaces, as in Examples 1 and 4, were heated at ambient humidity and 100° C for five months. In this test, the untreated black surface had an initial $\alpha_s$ of 0.85 which decreased to 0.81 while the treated surface, initially with an $\alpha_s = 0.89$ had a final absorbance of 0.84.

Thus the ammonium chromate solution treatment, while not conferring absolute protection on the copper black surface, significantly raises the performance characteristics as compared with an untreated surface.

We claim:

1. A method for improving the selectivity of a black copper oxide absorber surface which comprises contacting the surface with a solution containing chromate ions and ammonium ions for a period of time sufficient to increase solar absorption characteristics and minimize infrared re-emission characteristics of said black copper oxide absorber surface.

2. A method as claimed in claim 1, wherein the solution is an ammonium chromate solution.

3. A method as claimed in claim 1, wherein the solution contains about 10% by weight of ammonium chromate or the equivalent concentrations of a chromate salt and an ammonium salt.

4. A method as claimed in claim 1, wherein the treatment is carried out at a temperature of from 20° C to 80° C.

5. A method as claimed in claim 4, wherein the temperature is from 45° C to 80° C and the treatment time is from 5 to 20 minutes.

6. A black copper absorber having a surface produced by the method of claim 1.

7. A method for forming a black copper oxide absorber for solar energy absorption, which comprises forming an absorber having a surface of copper or a copper alloy, forming a copper black film on the surface, and treating the black film by the method claimed in claim 1.

8. A method as claimed in claim 1, wherein said solution is one which does not dissolve a black copper oxide absorper surface.

9. A method as claimed in claim 1, wherein the solution is alkaline, neutral or slightly acid.

10. A method as claimed in claim 9, wherein the treatment is carried out at a temperature of from 20° C to 80° C.

11. A method as claimed in claim 9, wherein the treatment is carried out at a temperature of from 45° C to 80° C and the treatment time is from 5 to 20 minutes.

12. A method as claimed in claim 11, wherein the solution contains about 10% by weight of ammonium chromate or the equivalent concentrations of a chromate salt and an ammonium salt.

* * * * *